United States Patent
Wang et al.

(10) Patent No.: US 8,670,441 B2
(45) Date of Patent: Mar. 11, 2014

(54) SYSTEM AND METHOD FOR MIGRATING A LARGE SCALE BATCH OF CUSTOMER ACCOUNTS FROM ONE VOIP SYSTEM TO ANOTHER VOIP SYSTEM

(75) Inventors: Changqing Wang, Acton, MA (US); Hong Xiao, Acton, MA (US); Yi Chen, Wellesley, MA (US); Amanjot S. Khaira, Boston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 591 days.

(21) Appl. No.: 12/139,120

(22) Filed: Jun. 13, 2008

(65) Prior Publication Data
US 2009/0310767 A1 Dec. 17, 2009

(51) Int. Cl.
| | |
|---|---|
| H04L 12/66 | (2006.01) |
| H04M 1/24 | (2006.01) |
| H04M 3/08 | (2006.01) |
| H04M 3/22 | (2006.01) |
| G06F 7/00 | (2006.01) |
| G06F 17/00 | (2006.01) |
| H04L 29/08 | (2006.01) |
| H04M 3/42 | (2006.01) |

(52) U.S. Cl.
CPC .... *H04L 29/08936* (2013.01); *H04L 29/08846* (2013.01); *H04M 3/42229* (2013.01); *H04M 3/42136* (2013.01); *H04M 3/42144* (2013.01)
USPC ...... 370/352; 379/201.02; 709/230; 707/609; 707/610; 707/626

(58) Field of Classification Search
CPC ............ H04M 3/42136; H04M 3/42144; H04M 3/42229; H04L 29/08846; H04L 29/08936
USPC ......... 370/352; 379/221.13, 201.02; 709/232, 709/230; 707/171, 609, 610, 626
See application file for complete search history.

(56) References Cited

U.S. PATENT DOCUMENTS

| | | | |
|---|---|---|---|
| 7,558,843 B2 * | 7/2009 | Lipscomb et al. ............ | 709/219 |
| 2001/0016831 A1 * | 8/2001 | Marsh et al. ................... | 705/34 |
| 2003/0027521 A1 * | 2/2003 | Yip et al. ..................... | 455/3.05 |
| 2005/0254470 A1 * | 11/2005 | Yashar ........................ | 370/338 |
| 2006/0215632 A1 * | 9/2006 | Adams et al. ................. | 370/352 |
| 2007/0008893 A1 * | 1/2007 | Singh et al. ................... | 370/241 |
| 2008/0065779 A1 * | 3/2008 | Isaac et al. .................... | 709/230 |

* cited by examiner

*Primary Examiner* — Ayaz Sheikh
*Assistant Examiner* — Tarell Hampton (57) ABSTRACT

A system and method in accordance with exemplary embodiments may include receiving account data associated with one or more accounts scheduled to be migrated from one or more first VoIP phone systems to a second VoIP phone system via a network, organizing the one or more accounts based on at least one customer service records and one system log, migrating the one or more accounts into one or more shell accounts provided by the second VoIP phone system, configuring each customer device associated with the one or more accounts to receive data from the second VoIP phone system, and migrating account settings data and account call history data associated with the one or more accounts from the one or more first VoIP phone systems to the second VoIP phone system.

20 Claims, 6 Drawing Sheets

SYSTEM AND METHOD FOR MIGRATING A LARGE SCALE BATCH OF CUSTOMER ACCOUNTS FROM ONE VOIP SYSTEM TO ANOTHER VOIP SYSTEM

BACKGROUND INFORMATION

In general, Voice over Internet Protocol (VoIP) phone systems may provide phone services to customers using digital technologies that may be connected to the Internet. A VoIP phone system may include several hardware and/or software components operating on a server-side and/or a customer-side of the VoIP phone system. For many different reasons, customers may change VoIP phone service providers by terminating VoIP phone service with one VoIP phone service provider and initiating VoIP phone service with another VoIP phone service provider. In many instances, migrating a VoIP customer account from one VoIP phone system to another VoIP phone system may involve a manual process that is time-consuming and inefficient. It is preferable, however, to minimize customer input, minimize phone service downtime, utilize existing customer devices, and/or minimize dependency on first VoIP phone systems when migrating customer accounts from a first VoIP phone system to a second VoIP phone system.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

These and other embodiments and advantages will become apparent from the following detailed description, taken in conjunction with the accompanying drawings, illustrating by way of example the principles of the various exemplary embodiments.

DETAILED DESCRIPTION OF PREFERRED EMBODIMENTS

The description below describes servers, engines, systems, and network elements that may include one or more modules, some of which are explicitly shown in the figures, others that are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

The description below also describes physical and logical elements of a migration system, some of which are explicitly shown in figures, others that are not. The inclusion of some physical elements of a migration system may help illustrate how a given system may be modeled. It should be noted, however, that all illustrations are purely exemplary and that the migration system described herein may be performed on different varieties of systems which may include different physical and logical elements.

Figure 1:
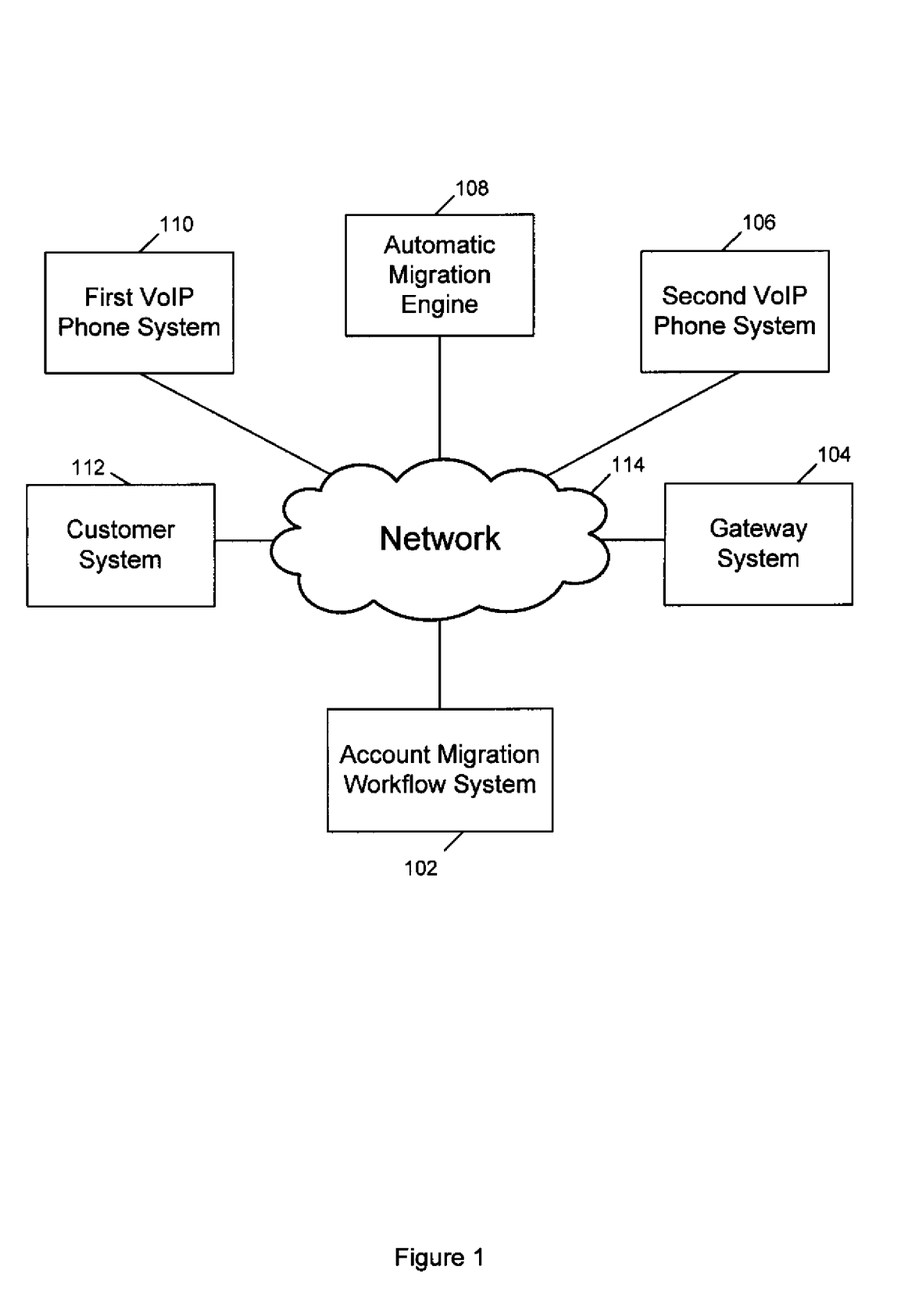
FIG. 1 illustrates a block diagram of a migration system in accordance with exemplary embodiments.

For instance, migration system 100 from FIG. 1 illustrates a simplified view of a migration system and various elements in the migration system. It is noted that other hardware and software not depicted may be included in migration system 100. It is also noted that migration system 100 illustrates a specific number of instances of first VoIP systems, automatic migration engines, second VoIP systems, customer systems, gateway systems, account migration workflow systems, and/or networks. It will be appreciated that a single instance and/or multiple instances of these entities may be included in a migration system.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, engines, systems, and network elements) separately. The functions described as being performed at various components may be performed at other components, and the various components may be combined and/or separated. Other modifications also may be made.

Migrating customer accounts from a first VoIP phone system to a second VoIP phone system may involve a process that heavily relies on human interaction. The number of customer accounts that may be migrated simultaneously may be limited by the amount of man-power available. Accordingly, many migration processes may include migrating one customer account at a time. Given the large amount of customer movement from and/or to various VoIP phone systems, migrating customer accounts in large scale batches has become more desirable.

In various embodiments, a large number of customer accounts may be migrated from a first VoIP phone system to a second VoIP phone system using an automated system, such as, a migration system. A migration system may include software and/or hardware configured to organize, manage, and/or migrate one or more customer accounts without customer input, with minimal customer input, and/or with minimal first VoIP phone service provider input. In various embodiments, the migration system may include software and/or hardware configured to organize, manage, and/or migrate a large number (e.g., hundreds, thousands, tens of thousands) of customer accounts.

In various embodiments, minimal customer input may include a customer confirming credit card information and/or a customer performing any other task to aid in the migration process. In various embodiments, minimal first VoIP phone service provider input may include transmitting one or more signals to a customer system to initiate the configuration of the customer system to receive and/or transmit data to the second VoIP phone system and/or performing any other task to aid in the migration process.

In an exemplary embodiment, a first VoIP phone service provider may include a phone service provider associated with a VoIP phone system that previously provided VoIP phone service to a customer. In an exemplary embodiment, a second VoIP phone service provider may include a phone service provider associated with a Vow phone system that currently provides VoIP phone service to a customer.

In various embodiments, a large number of customer accounts may be migrated from a first VoIP phone system to a second VoIP phone system using a partially automated migration system. Accordingly, one or more functions of the migration system may be performed using human interaction.

In various embodiments, a migration system may begin to migrate a large number of customer accounts by analyzing and/or filtering one or more customer accounts. Analyzing a customer account may include accessing a customer service record and/or a system log associated with a customer to determine if a particular customer is associated with an abnormal customer device and/or a customer device with an abnormal configuration. An abnormal customer device may include an obsolete customer device and/or an unsupported customer device that is not configured to function according to the second VoIP phone system's requirements. In various embodiments, a customer device with an abnormal configuration may include a customer device that is associated with one or more devices that may impair the quality of service provided by the second VoIP phone system. If, for example, the migration system determines that a particular customer account is associated with an abnormal customer device and/or a customer device with an abnormal configuration, the migration system may filter out (e.g., remove) the customer account from one or more remaining customer accounts that may be migrated. If, however, the migration system determines that a particular customer account is not associated with an abnormal customer device and/or a customer device with an abnormal configuration, the migration system may continue the migration process by grouping and/or ordering one or more customer accounts.

Given that the migration of a large number of customer accounts may utilize a significant amount of man-power, computing/processing power, computing resources (e.g., computers, network bandwidth), and time (e.g., one or more days, one or more weeks, one or more months), the migration system may partition the customer accounts scheduled to be migrated into groups. The groups may be created such that the customer accounts associated with a particular group may be migrated in a single day (e.g., a migration window). In various embodiments, a migration window (e.g., the amount of time to migrate one or more customer accounts) may be determined to minimize the impact of the migration process on a customer. For example, a migration window may be determined to begin at or near midnight and end within two hours. In various embodiments, a migration window may be determined by the implementers of the first VoIP phone system, the implementers of the second VoIP phone system, the implementers of the gateway system, and/or the implementers of the migration system.

In various embodiments, the migration of customer accounts may create the risk of system failures in the several systems involved, and thus, the migration system may attempt to reduce the possibility of a system failure by operating one or more subsystems and/or one or more components of the migration system on one or more small groups of customer accounts. Grouping one or more customer accounts may include partitioning the large number of customer accounts into one or more customer account groups based on telephone service usage pattern, time-zone, call-plan, desired size of group (e.g., group of any 10 customer accounts, group of any 100 customer accounts), system capabilities (e.g., processing power may support customer account groups of 10, processing power may support customer account groups of 100) and/or any other characteristic that may be used to group the large number of customer accounts into one or more customer account groups. For example, the migration system may group one or more customer accounts associated with low telephone service usage into one or more customer account groups and/or may group one or more customer accounts associated with high telephone service usage into one or more other customer account groups. Accordingly, the migration system may migrate customer accounts with low telephone service usage first and gradually migrate customer accounts with average telephone service usage and/or high telephone service usage.

In various embodiments, to test errors and/or failures in newly created accounts associated with the second VoIP phone system, the migration system may create one or more shell accounts. A shell account may include a standard account that is created for testing and is not associated with any feature settings. A feature setting may include call-waiting, three-way calling, call-forwarding, and/or any other telephone service calling features. Accordingly, the migration system may select and/or migrate one or more customer accounts associated with a particular customer account group into one or more shell accounts to test one or more new customer accounts created in the second VoIP phone system prior to activation of the one or more new customer accounts.

In various embodiments, the migration system may configure and/or cause to be configured the Public Switch Telephone Network (PSTN)-to-VoIP gateway for one or more customer accounts associated with a particular customer account group. Configuring the PSTN-to-VoIP gateway may include ensuring that all incoming telephone calls from a PSTN may be properly directed to the second VoIP phone system.

In various embodiments, the migration system may update and/or may cause the updating of one or more configuration files associated with one or more customer devices. The migration system may reboot and/or may cause the rebooting of one or more customer devices. In various embodiments, rebooting one or more customer devices may initiate the customer devices to retrieve (e.g., fetch) one or more configuration files from the migration system. The migration system may terminate and/or may cause the terminating of one or more customer accounts associated with the first VoIP phone system. The migration system may test a dial-tone for one or more customer devices, migrate one or more feature setting from the first VoIP phone system to the second VoIP phone system, and/or migrate one or more call histories from the first VoIP phone system to the second VoIP phone system.

FIG. 1 illustrates a block diagram of a migration system 100 in accordance with exemplary embodiments. The account migration workflow system 102 may transmit migration control signals to one or more elements of the migration system 100, such as, the first VoIP phone system 110, the automatic migration engine 108, the second VoIP phone system 106, the customer system 112 and/or the gateway system 104 using network 114. The functions of the systems 102, 104, 106, 108, 110, and 112 may be performed at other systems remote or local to the migration system 100, and the systems 102, 104, 106, 108, 110, and 112 may be combined and/or separated.

Using migration control signals, the account migration workflow system 102 may organize and/or manage the elements of the migration system 100 in migrating one or more customer accounts from the first VoIP phone system 10 to the second VoIP phone system 106. Migration control signals may include signals that initiate and/or terminate one or more migration functions. In various embodiments, a migration control signal may include an electronic signal that may be acted upon by an electronic device. In various embodiments, a migration control signal may be associated with an Email message, an Instant Message, a telephone call, and/or any other message that may be created and/or perceived by a human.

The account migration workflow system 102 may receive migration response signals from one or more elements of the migration system 100, such as, the first VoIP phone system 110, the automatic migration engine 108, the second VoIP phone system 106, the customer system 112 and/or the gateway system 104 using network 114. Migration response signals may include signals that provide a status of one or more requested functions and/or signals that include data associated with one or more requested functions and/or migration functions. In various embodiments, a migration response signal may include an electronic signal that may be acted upon by an electronic device. In various embodiments, a migration response signal may be associated with an Email message, an Instant Message, a telephone call, and/or any other message that may be created and/or perceived by a human.

The network 114 may include an analog telephone network, a digital telephone network, a cellular telephone network, a public wide area network ("WAN"), such as the Internet, or, different connections, such as combinations of public and private WANs, local areas networks ("LANs"), wireless LANs, encrypted networks, body area networks, or other wired or wireless networks capable of communicating migration control signals, migration response signals, and/or migration information to and/or from one or more elements of the migration system 100. In an exemplary embodiment, the network 114 may include one or more networks operating as a stand-alone network or in cooperation with each other. Use of the term network herein is not intended to limit the network to a single network.

In exemplary embodiments, the migration system 100 may include an account migration workflow system 102, a first VoIP phone system 110, an automatic migration engine 108, a second VoIP phone system 106, a customer system 112, and/or a gateway system 104 communicatively coupled to a network 114. The network 114 may communicate migration control signals from the account migration workflow system 102 to the first VoIP phone system 110, the automatic migration engine 108, the second VoIP phone system 106, the customer system 112, and/or the gateway system 104. The network 114 may communicate migration response signals from the first VoIP phone system 110, the automatic migration engine 108, the second VoIP phone system 106, the customer system 112, and/or the gateway system 104 to the account migration workflow system 102.

In an exemplary embodiment, the account migration workflow system 102 may include software and/or hardware that is configured to receive migration response signals from the network 114 and/or may communicate migration control signals to the network 114. The account migration workflow system 102 may include, but is not limited to, a computer device or communications device including, e.g., a personal computer (PC), a workstation, a thin system, a fat system, network appliance, an Internet browser, a server, and/or any other device that is configured to receive migration response signals and/or transmit migration control signals to organize and/or manage the migration of a large number of customer accounts from the first VoIP phone system 110 to the second VoIP phone system 106.

In various embodiments, one or more functions of the account migration workflow system 102 may be performed using human interaction. Accordingly, human interaction may be used to organize and/or manage the migration of a large number of customer accounts from the first VoIP phone system 110 to the second VoIP phone system 106.

In an exemplary embodiment, the first VoIP phone system 110 may include software and/or hardware configured to receive migration control signals from the network 114 and/or may communicate migration response signals to the network 114. The first VoIP phone system 110 may include, but is not limited to, a computer device or communications device including, e.g., a personal computer (PC), a workstation, a thin system, a fat system, network appliance, an Internet browser, an application programming interface (API), a server, and/or any other device that is configured to receive migration control signals and/or transmit migration response signals to aid in the migration of a large number of customer accounts from the first VoIP phone system 110 to the second VoIP phone system 106.

In an exemplary embodiment, the automatic migration engine 108 may include software and/or hardware configured to receive migration control signals from the network 114 and/or may communicate migration response signals to the network 114. The automatic migration engine 108 may include, but is not limited to, a computer device or communications device including, e.g., a personal computer (PC), a workstation, a thin system, a fat system, network appliance, an Internet browser, an application programming interface (API), a server, and/or any other device that is configured to receive migration control signals and/or transmit migration response signals to aid in the migration of a large number of customer accounts from the first VoIP phone system 110 to the second VoIP phone system 106.

In an exemplary embodiment, the second VoIP phone system 106 may include software and/or hardware configured to receive migration control signals from the network 114 and/or may communicate migration response signals to the network 114. The second VoIP phone system 106 may include, but is not limited to, a computer device or communications device including, e.g., a personal computer (PC), a workstation, a thin system, a fat system, network appliance, an Internet browser, an application programming interface (API), a server, and/or any other device that is configured to receive migration control signals and/or transmit migration response signals to aid in the migration of a large number of customer accounts from the first VoIP phone system 10 to the second VoIP phone system 106.

In an exemplary embodiment, the customer system 112 may include software and/or hardware configured to receive migration control signals from the network 114 and/or may communicate migration response signals to the network 114. The customer system 112 may include, but is not limited to, a computer device or communications device including, e.g., customer premises equipment (CPE), a personal computer (PC), a workstation, a mobile device, a phone, a handheld PC, a personal digital assistant (PDA), a thin system, a fat system, network appliance, an Internet browser, an application programming interface (API), a paging device, an alert device, a television, an interactive television, a receiver, a tuner, a high definition (HD) television, an HiD receiver, a video-on-demand (VOD) system, a server, and/or any other device that is configured to receive migration control signals and/or transmit migration response signals to aid in the migration of a large number of customer accounts from the first VoIP phone system 110 to the second VoIP phone system 106.

In an exemplary embodiment, the gateway system 104 may include software and/or hardware configured to receive migration control signals from the network 114 and/or may communicate migration response signals to the network 114. The gateway system 104 may include, but is not limited to, a computer device or communications device including, e.g., a personal computer (PC), a workstation, a thin system, a fat system, network appliance, an Internet browser, an application programming interface (API), a server, a gateway, a router, and/or any other device that is configured to receive migration control signals and/or transmit migration response signals to aid in the migration of a large number of customer accounts from the first VoIP phone system 110 to the second VoIP phone system 106.

It is noted that any of the functions of the elements of the migration system 100 may be performed using human interaction. Accordingly, human interaction may be used to aid in the migration of a large number of customer accounts from the first VoIP phone system 110 to the second VoIP phone system 106. The account migration workflow system 102, the automatic migration engine 108, and the gateway system 104 are discussed in further detail below.

Figure 2:
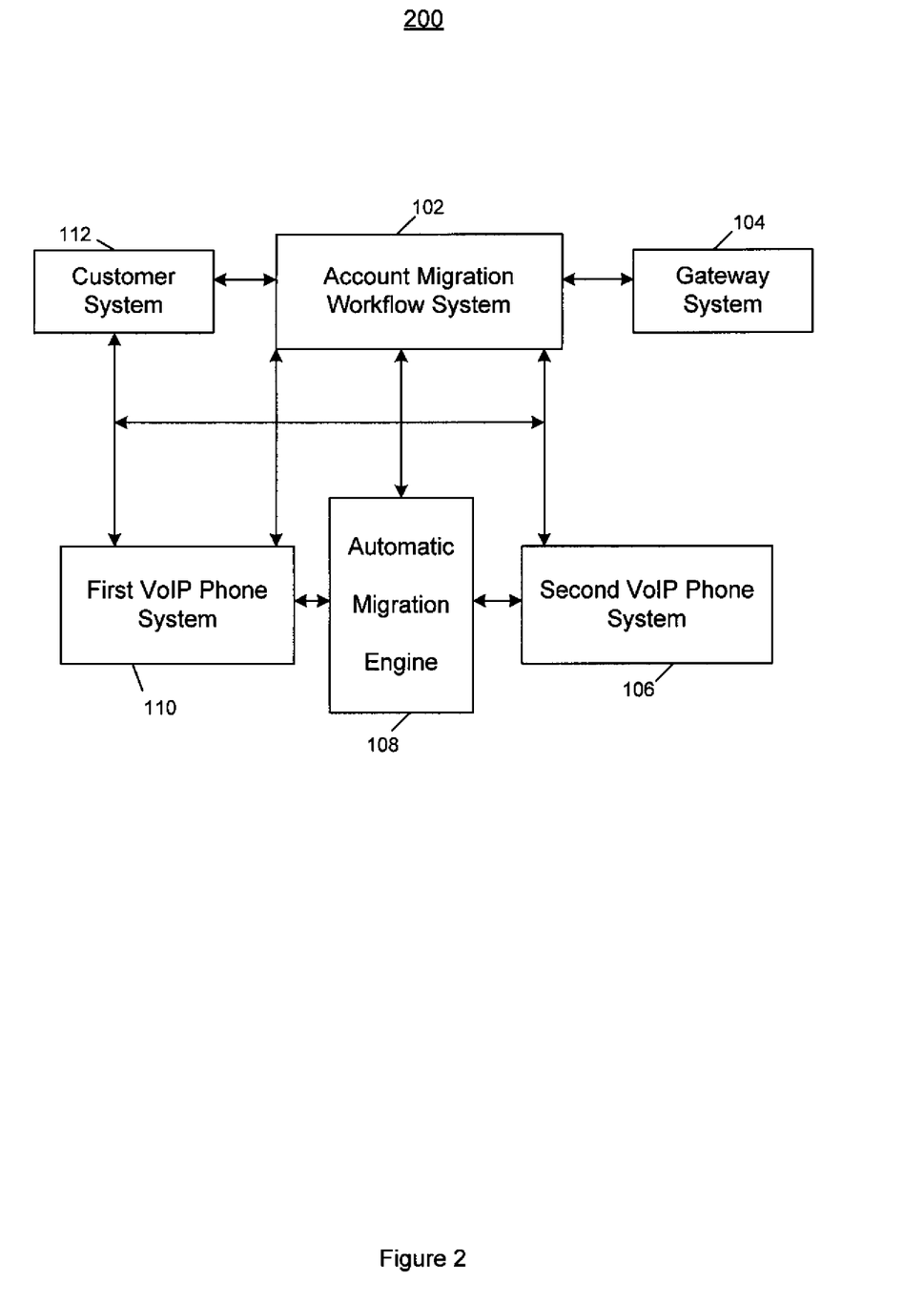
FIG. 2 illustrates a block diagram of the migration system in accordance with another exemplary embodiment.

FIG. 2 illustrates a block diagram of the migration system 200 in accordance with another exemplary embodiment. As previously illustrated in FIG. 1, one or more elements of the migration system 100 may be communicatively coupled using a network (e.g., network 114). In various embodiments, the elements of migration system 200 may be communicatively coupled to one another as illustrated in FIG. 2. Accordingly, in addition to utilizing a network to aid in the propagation of signals from one element to the next, the migration system 200 may be configured as illustrated in FIG. 2.

As illustrated, the account migration workflow system 102 may be configured to operate as the high level control mechanism (e.g., an intermediary system to coordinate functions between one or more sub-systems) to organize and/or manage the migration of a large number of customer accounts from the first VoIP phone system 110 to the second VoIP phone system 106 by interfacing with and/or coordinating one or more elements of the migration system 200. In various embodiments, the account migration workflow system 102 may define and/or execute one or more top-level processes (e.g., a coordinating process and/or function, an organizing process and/or function) associated with the entire migration task. For example, the account migration workflow system 102 may define and/or execute pre-migration phase tasks, such as, customer account grouping and/or credit card collection steps. The credit card collection steps may include accessing and/or collecting credit card information associated with each customer account to be migrated from the first VoIP phone system 110 to the second VoIP phone system 106.

In another example, the account migration workflow system 102 may define and/or execute migration phase tasks, such as, generating and/or transmitting an order for the gateway system 104 to prepare to re-configure the PSTN-to-VoIP gateway for one or more customer accounts associated with a particular customer account group such that all incoming telephone calls are properly directed to the second VoIP phone system 106. Additional migration phase tasks performed by the account migration workflow system 102 may include generating and/or transmitting one or more notifications of the upcoming migration to one or more customer systems 112 for one or more customer accounts associated with the particular customer account group and/or generating and/or transmitting one or more notifications of the upcoming migration to the second VoIP phone system 106.

The account migration workflow system 102 may initiate the automatic migration engine 108 to discontinue customer access to one or more customer accounts associated the particular customer account group during the migration process. In addition, the account migration workflow system 102 may initiate the automatic migration engine 108 to migrate core account data from the first VoIP phone system 110 to the second VoIP phone system 106. The account migration workflow system 102 may create a customer account group that includes one or more customer accounts that have passed the validation process executed by the gateway system 104 (discussed in further detail below), generate and/or transmit an order for the gateway system 104 to re-configure the PSTN-to-VoIP gateway for one or more customer accounts associated with the valid customer account group such that all incoming telephone calls are properly directed to the second VoIP phone system 106, and/or generate and/or transmit an order for the first VoIP phone system 110 to update one or more configuration files associated with one or more customer devices of the valid customer account group such that the one or more customer devices may be configured to transmit data to and/or receive data from the second VoIP phone system 106 and stop billing customer accounts associated with the valid customer account group.

The account migration workflow system 102 may initiate the automatic migration engine 108 to execute one or more device testing workflows to verify that one or more customer accounts associated with the valid customer account group have been migrated to the second VoIP phone system 106, and/or initiate the automatic migration engine 108 to copy and/or migrate the remaining data (e.g., one or more calling logs, one or more billing histories) from the first VoIP phone system 110 to the second VoIP phone system 106 associated with one or more customer accounts of the valid customer account group.

In yet another example, the account migration workflow system 102 may define and/or execute post migration phase tasks, such as, ensuring that the configuration of one or more customer devices associated with the valid customer account group will continue to be configured to transmit data to and/or receive data from the second VoIP phone system 106 after a reset of the customer device. For example, a manufacturer of a particular customer device may have set (e.g., burned in) the customer device to point to a Uniform Resource Locator (URL) associated with the first VoIP phone system 110's configuration settings. Accordingly, the Domain Name System (DNS) associated with the customer device may be updated to redirect the URL to the new configuration settings associated with the second VoIP phone system 106 such that a reset of the customer device may not modify the configuration settings.

The account migration workflow system 102 may define and/or execute high-level manual and/or automatic migration processes (e.g., workflows) and support a wide range of communication methods, such as, Emails, telephone calls, and/or propagation of electronic signals. The automatic migration engine 108 may define and/or execute low-level (e.g., tedious tasks, repetitive tasks, and/or sub-system tasks) automatic migration processes (e.g., workflows) and may communicate mainly using one or more application programming interfaces (APIs) to communicate with the first VoIP phone system 110 and the second VoIP phone system 106.

As illustrated, the automatic migration engine 108 may be configured to communicate with the first VoIP phone system 110 and the second VoIP phone system 106 to execute one or more sub-migration processes (e.g., sub-workflows) for migrating individual accounts from the first VoIP phone system 110 to the second VoIP phone system 106. In various embodiments, the automatic migration engine 108 may be configured to be flexible in the manner in which it migrates customer accounts. For example, the automatic migration engine 108 may be configured to migrate a group of customer accounts, one after the other In another example, the automatic migration engine 108 may be configured to migrate a group of customer accounts from one step in the migration process to the next step in the migration process (e.g., not necessarily the first or the last step). In yet another example, the automatic migration engine 108 may be configured to resume the migration process at the last step executed prior to a failure in the migration process after the error that caused the failure has been resolved, without proceeding through the entire migration process from the first step.

Since the automatic migration engine 108 is configured to execute low-level (e.g., tedious and/or repetitive migration processes), such as, migrating individual customer accounts, the automatic migration engine 108 may be configured to operate as an intermediary sub-system of the migration system 200 and mainly communicates with and/or interacts with the first VoIP phone system 110 and the second VoIP phone system 106. In order to maximize the performance of the migration system 200, the automatic migration engine 108 may be designed as a fully automatic system. In various embodiments, the automatic migration engine 108 may be configured to perform tasks which may be considered to be tedious and/or repetitive by the implementers of the migration system 200, such as, migrating individual customer accounts one after the other and/or migrating a group of customer accounts from one step to the next step. In various embodiments, the automatic migration engine 108 may be configured to be non-intrusive to the first VoIP phone system 110 by utilizing one or more pre-existing function calls that are read-only operations. The automatic migration engine 108 is described in further detail below.

The gateway system 104 may include software and/or hardware configured to direct one or more incoming telephone calls to the proper VoIP phone system. In various embodiments, the gateway system 104 may be configured to validate one or more customer accounts associated with the particular customer account group to be migrated. Validating the one or more customer accounts may include validating one or more telephone numbers and/or one or more configurations associated with the one or more customer accounts associated with the particular customer account group. In various embodiments, the gateway system 104 may be configured to re-configure the PSTN-to-VoIP gateway for one or more customer accounts associated with the valid customer account group such that all incoming telephone calls are properly directed to the second VoIP phone system 106.

Figure 3:
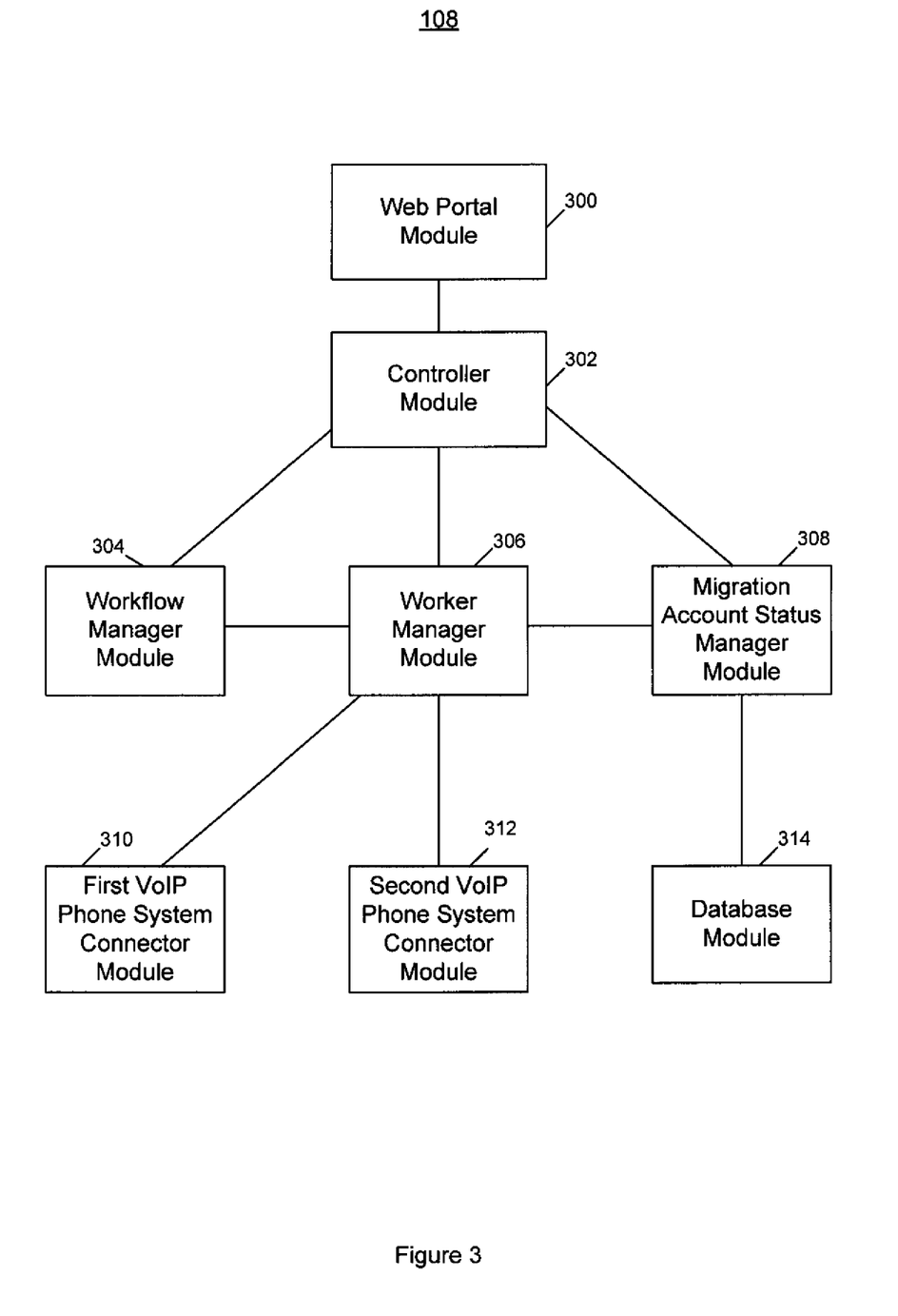
FIG. 3 illustrates exemplary modules of an automatic migration engine in accordance with exemplary embodiments.

FIG. 3 illustrates exemplary modules of an automatic migration engine 108 in accordance with exemplary embodiments. In an exemplary embodiment, the automatic migration engine 108 may include a web portal module 300, a controller module 302, a workflow manager module 304, a workflow worker manager module 306, a migration account status manager module 308, a first VoIP phone system connector module 310, a second VoIP phone system connector module 312, and/or a database module 314. It is noted that the modules 300, 302, 304, 306, 308, 310, 312, and 314 are exemplary. The functions of the modules 300, 302, 304, 306, 308, 310, 312, and 314 may be performed at other modules remote or local to the automatic migration engine 108, and the modules 300, 302, 304, 306, 308, 310, 312, and 314 may be combined and/or separated.

The web portal module 300 may include a web browser client associated with the automatic migration engine 108, such as, but not limited to, INTERNET EXPLORER™, NAVIGATOR™, or FIREFOX™ web browser programs, offered by Microsoft Corporation of Redmond, Wash., Time Warner of New York, N.Y., and the Mozilla Foundation of Mountain View, Calif., respectively. The web portal module 300 may be used to input and/or receive information from the automatic migration engine 108. For example, the web portal module 300 may be used by implementers of the migration system to operate the automatic migration engine 108.

The controller module 302 may include software and/or hardware configured to realize the migration control signals received from the general account migration workflow system 102 and/or one or more implementers of the migration system using the web portal module 300. The controller module 302 may be configured to coordinate one or more migration functions with the workflow manager 304, the workflow worker manager module 306 and/or the migration account status manager module 308 based on the one or more migration control signals received.

The workflow manager module 304 may include software and/or hardware configured to manage one or more workflows which may include creating and/or composing one or more high-level workflows from one or more low-level workflows and/or one or more sub-workflows. In various embodiments, a workflow may include a set of execution steps that are executed one at a time in an ordered sequence. A high-level workflow may include a set of low-level workflows and/or a set of sub-workflows. In various embodiments, a workflow may define a business logic and/or a business process.

The workflow worker manager module 306 may include software and/or hardware configured to generate and/or manage one or more workflow workers. A workflow worker may include a working process that may execute a workflow. In various embodiments, a workflow worker may be associated with a lifecycle that begins at the beginning of a workflow and ends at the end of a workflow. The workflow worker is discussed in further detail below.

The migration account status manager module 308 may include software and/or hardware configured to book-keep, manage, and/or maintain one or more customer accounts in the migration process and/or the status of each customer account in the migration process. In various embodiments, a workflow may include several steps. If, for example, the migration of a particular customer accounts stops in the middle of a workflow, the migration process may be resumed at the proper step using the migration account status manager module 308. Accordingly, the migration account status manager module 308 may be configured to monitor the migration process and/or record the status of migration for each customer account in the migration process such that one or more partially migrated customer accounts may resume the migration process from the step prior to a stopping point.

The first VoIP phone system connector module 310 may include software and/or hardware configured to communicatively couple the automatic migration engine 108 to the first VoIP phone system 110. The second VoIP phone system connector module 312 may include software and/or hardware configured to communicatively couple the automatic migration engine 108 to the second VoIP phone system 106.

The database module 314 may include software and/or hardware configured to access and/or store information associated with one or more customer accounts in the migration process. In various embodiments, this information may include migration status and/or other migration related information.

By way of a non-limiting example, the modules of the automatic migration engine 108 may interact with each other in the following manner. For example, using a web browser associated with the web portal module 300, an implementer of the migration system may enter and submit a migration command, such as, "Migrate 500 customer accounts starting with account 10500 to 10999 using the data migration workflow WFI." Accordingly, the controller module 302 may analyze the command received and may access the workflow manager module 304 to determine if the specified workflow is valid and/or access the migration account status manager module 308 to determine if the customer accounts specified are valid. The migration account status manager module 308 may then prepare the specified customer accounts for migration by locking the specified customer accounts such that the specified customer accounts may not be modified by any other source.

If the previous steps execute successfully, the controller module 302 may execute the following steps until all the specified customer accounts have been processed: request a workflow worker that is initialized with the specified workflow from the workflow worker manager module 306, if a workflow worker is not available, the controller module 302 may wait for an available workflow worker; request a specified customer account from the migration account status manager module 308, if all specified customer accounts are complete the process may end; pass the specified customer account to the workflow worker and initiate the workflow, the workflow worker may operate within its own thread until the workflow is complete; proceed to the first step.

In various embodiments, while the workflow worker is executing, it may execute a specified workflow step by step. These steps may include read operation associated with the first VoIP phone system 110 and/or a write operation associated with the second VoIP phone system 106. When a workflow has completed for a specified customer account successfully and/or unsuccessfully, the workflow worker manager module 306 may transmit the migration status of the specified customer account to the migration account status manager module 308. In various embodiments, the migration status of a customer account may be represented by an identification of the last step that the migration process successfully executed and/or additional migration status information. If, for example, the migration process failed at a particular step for a specified account, in addition to the identification of the last successfully executed step, the migration status may also include a description of one or more failures and/or errors.

Figure 4:
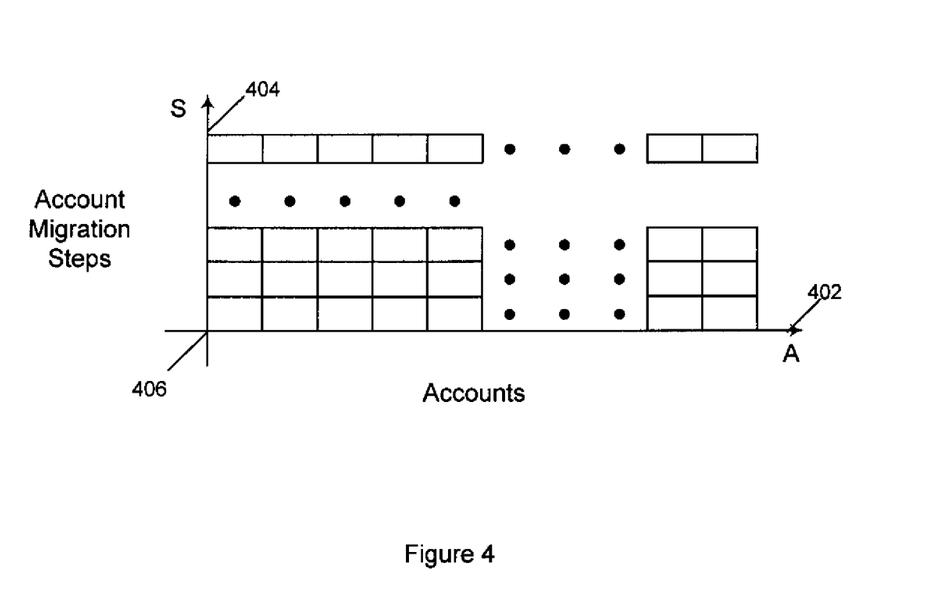
FIG. 4 illustrates an account migration activity space model in accordance with exemplary embodiments.

FIG. 4 illustrates an account migration activity space model 400 in accordance with exemplary embodiments. As previously discussed, while the automatic migration engine 108 may support automatic migration of individual customer accounts, the account migration workflow system 102 may attempt to efficiently use the automatic migration engine 108 and/or human resources to optimize the migration of all the customer accounts to be migrated. Accordingly, an account migration activity space model may be used to devise the most efficient way to migrate a large number of customers from a first VoIP phone system 110 to a second VoIP phone system 106.

As illustrated in FIG. 4, the account migration activity space model may include two dimensions. The A-axis dimension 406 may include the customer accounts. The S-axis dimension 404 may include the steps for the migration of a customer account. Accordingly, a pair of an account and a step (e.g., (Customer Account 1095, Migration Step 3), (Customer Account 1111, Migration Step 5)) may determine a migration activity. In various embodiments, one or more customer accounts may be grouped according to common attributes and/or one or more consecutive steps may be grouped into step groups and/or sub-workflows. Accordingly, an account group and a step group may determine an activity group.

Figure 5:
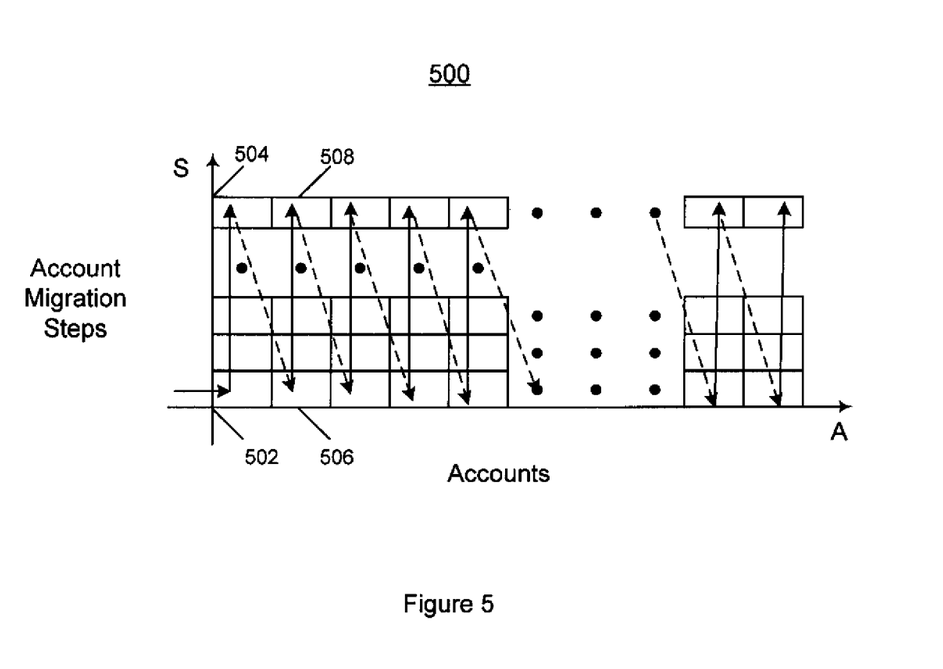
FIG. 5 illustrates a sequential migration method in accordance with exemplary embodiments.

FIG. 5 illustrates a sequential migration method 500 in accordance with exemplary embodiments. As previously discussed, an account migration activity space model may be used to analyze, design, and/or optimize various customer account migration strategies. A customer account migration strategy may include a specific way and/or logic for creating migration activity groups and/or determine the execution order of the migration activity group. For example, the simplest, but least efficient customer account migration strategy may include the sequential migration as illustrated in FIG. 5. Accordingly, the migration of all customer accounts may be executed one customer account after the other customer accounts from the first step to the last step for each customer account.

As shown in FIG. 5, the sequential migration strategy may begin at point 502 at the first customer account at the first step and automatically execute all the steps for that customer account one after the other until the migration process reaches point 504. Next, the migration process may start at point 506 with the next customer account at the first step associated with that customer account and execute all the steps for that customer account one after the other until the migration process reaches point 508. The sequential migration may continue in this manner until all customer accounts have been migrated.

Figure 6:
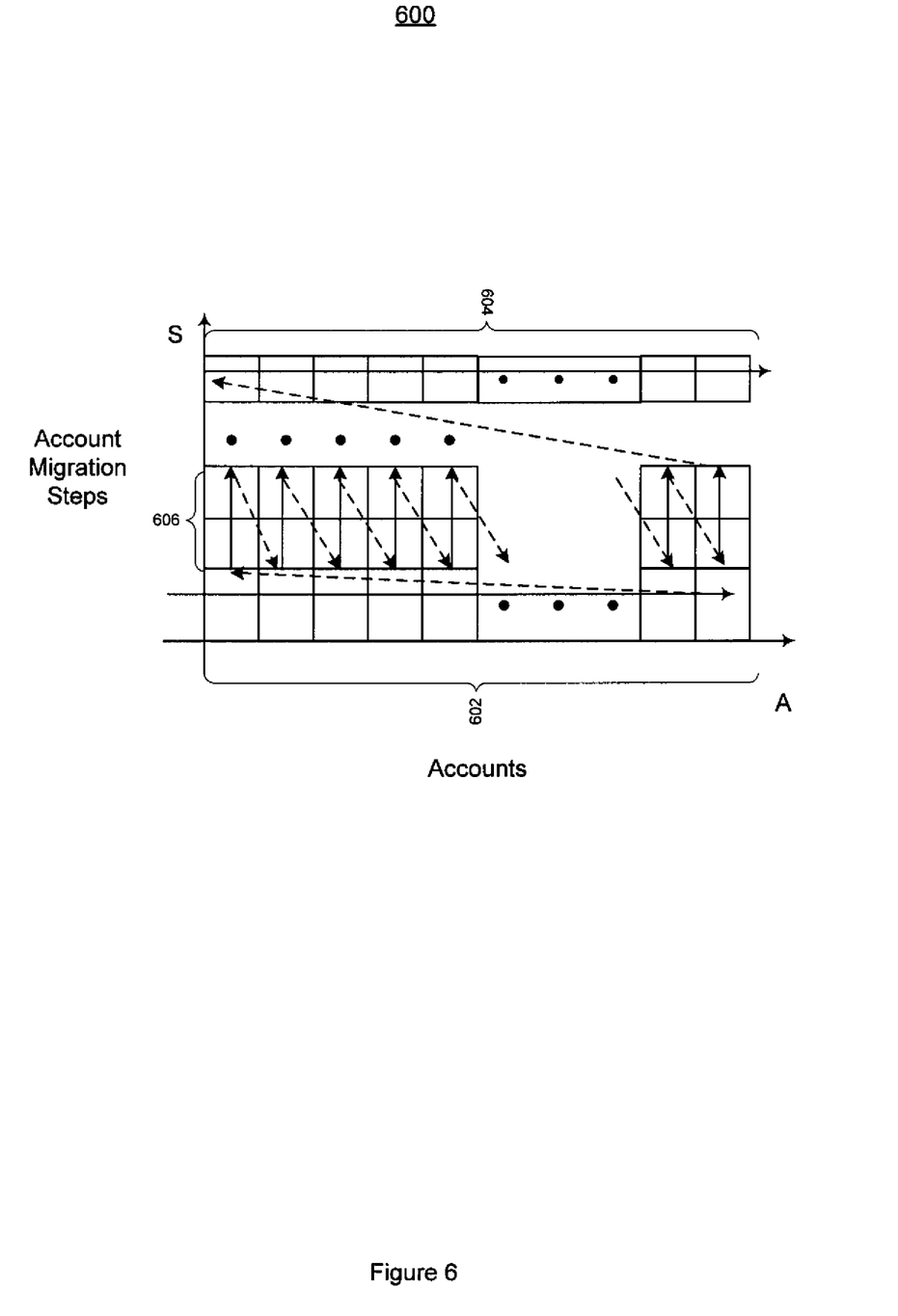
FIG. 6 illustrates a general workflow migration method in accordance with exemplary embodiments.

FIG. 6 illustrates a workflow migration method 600 in accordance with exemplary embodiments. As previously discussed, migrating a large number of customer accounts, such as, tens of thousands of customer accounts, using the sequential migration strategy may be too time-consuming. Accordingly, customer accounts and/or steps may be grouped in order to design the most efficient migration process possible as illustrated in FIG. 6.

To minimize the risk of failures, the general account migration workflow system 102 may utilize the following strategy to partition and/or group one or more customer accounts 602, 604 and/or group one or more steps 606 to create one or more migration activity groups and/or to define the order in which the one or more migration activity groups may be executed: The size of the group may be determined by the number of customer accounts that may be migrated by a migration system; The test customer account group may be determined to test the migration process on small groups of test customer accounts to minimize the effects of possible system failures; The average customer accounts groups, which may include customer accounts without abnormal configurations; The hybrid customer account group may include customer accounts associated with one or more characteristics, such as, usage pattern, features, etc.; The normal customer account group may include customer accounts that may execute the migration process at a normal pace after the migration system has been tested.

Figure 7:
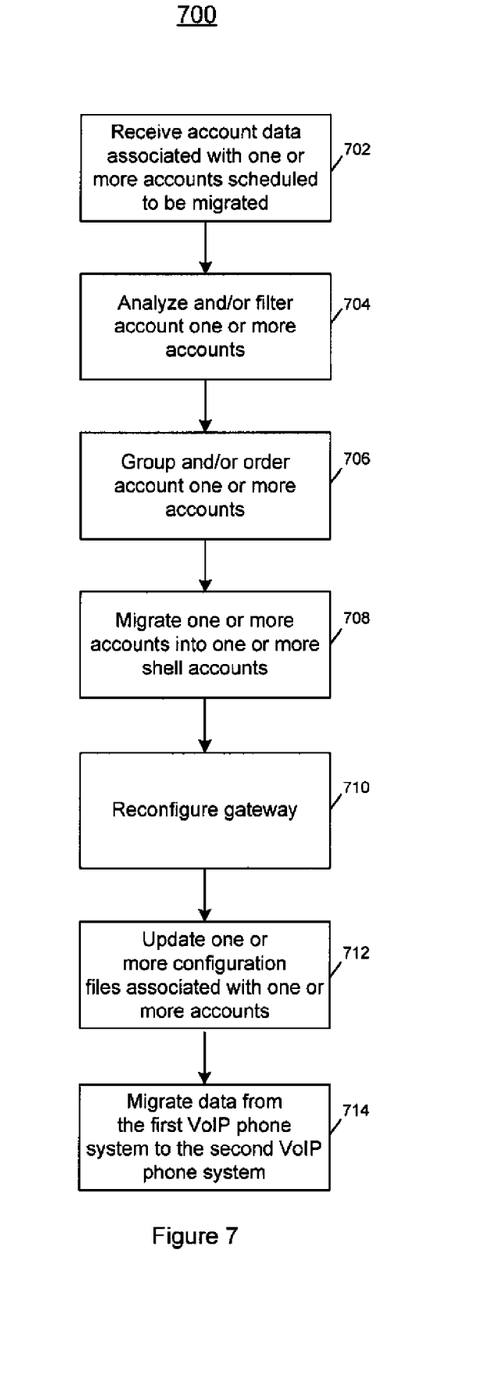
FIG. 7 illustrates a flowchart of a method for migrating a batch of accounts in accordance with exemplary embodiments.

FIG. 7 illustrates a flowchart of a method 700 for migrating a large number of customer accounts in accordance with exemplary embodiments. This exemplary method is provided by way of example, as there are a variety of ways to carry out methods disclosed herein. The method 700 shown in FIG. 7 may be executed or otherwise performed by one or a combination of various systems. The method 700 is described below as carried out by the migration system 100 shown in FIG. 1 by way of example, and various elements of the migration system 100 are referenced in explaining the example method of FIG. 7. Each block shown in FIG. 7 represents one or more processes, methods, or subroutines carried in the exemplary method 700. Referring to FIG. 7, the exemplary method 700 may begin at block 702.

In block 702, the method 700 may include receiving customer account data associated with one or more customer accounts scheduled to be migrated from a first VoIP phone system to a second VoIP phone system 110 via a network. In an exemplary embodiment, the migration system 100 may receive customer account data from a first VoIP phone system 110 using the automatic migration engine 108. The method 700 may continue to block 704.

In block 704, the method 700 may include analyzing and/or filtering one or more customer accounts. In an exemplary embodiment, analyzing and/or filtering one or more customer accounts may include the account migration workflow system 102 accessing a customer service record and/or a system log associated with a customer to determine if a particular customer is associated with an abnormal customer device and/or a customer device with an abnormal configuration. If, for example, the account migration workflow system 102 determines that a particular customer account is associated with an abnormal customer device and/or a customer device with an abnormal configuration, the migration system may filter out (e.g., remove) the customer account from one or more remaining customer accounts that may be migrated. If, however, the account migration workflow system 102 determines that a particular customer account is not associated with an abnormal customer device and/or a customer device with an abnormal configuration, the method 700 may continue the migration process by grouping and/or ordering one or more customer accounts in block 706.

In block 706, the method 700 may include grouping one or more customer accounts. In an exemplary embodiment, the account migration workflow system 102 may group one or more customer accounts by partitioning a large number of customer accounts into one or more customer account groups based on telephone service usage pattern, time-zone, call-plan, desired group size (e.g., group of any 10 customer accounts, group of any 100 customer accounts) and/or any other characteristic that may be used to group the large number of customer accounts into one or more customer account groups. The method 700 may continue to block 708.

In block 708, the method 700 may include migrating one or more customer accounts into one or more shell accounts. In an exemplary embodiment, the migration system 100 may create one or more shell accounts on the second VoIP phone system 106 for testing the customer accounts. The one or more shell accounts may not be associated with call-features. In various embodiments, the migration system 100 may migrate one or more customer accounts into one or more shell accounts using the automatic migration engine 108. The method 700 may continue to block 710.

In block 710, the method 700 may include reconfiguring a gateway system 104. In an exemplary embodiment, the account migration workflow system 102 may generate and/or transmit an order for a Public Switch Telephone Network (PSTN)-to-VoIP gateway (e.g., the gateway system 104) to reconfigure one or more customer accounts associated with a particular customer account group. Reconfiguring the gateway system 104 may include ensuring that all incoming telephone calls from a PSTN may be properly directed to the second VoIP phone system 106. The method 700 may continue to block 712.

In block 712, the method 700 may include updating one or more configuration files of one or more customer devices associated with one or more customer accounts. In an exemplary embodiment, the account migration workflow system 102 may generate and/or transmit an order to the first VoIP phone system for one or more configuration files associated with one or more customer devices to be updated such that the customer device may be configured to receive data from and/or transmit data to the second VoIP phone system 106. The method 700 may continue to block 714.

In block 714, the method 700 may include migrating one or more feature setting from the first VoIP phone system 110 to the second VoIP phone system 106 and/or migrating one or more call histories from the first VoIP phone system 110 to the second VoIP phone system 106. In an exemplary embodiment, the automatic migration engine 108 may migrate the one or more call feature settings and/or one or more call histories using the first VoIP phone system connector module 310 and/or the second VoIP phone system connector 312. The method 700 may then end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
    receiving account data associated with one or more accounts scheduled to be migrated from one or more first VoIP phone systems to a second VoIP phone system via a network;
    organizing the one or more accounts based on at least one customer service record and at least one system log, wherein the organizing comprises:
        determining, based on the at least one of the customer service record and the at least one system log, whether a corresponding account is associated with at least one of an abnormal customer device or an abnormal customer device configuration; and
        identifying as abnormal an account corresponding to at least one of an abnormal customer device or an abnormal customer device configuration;
    migrating a set of the one or more accounts, excluding at least the abnormal account, into one or more shell accounts provided by the second VoIP phone system;
    configuring, using a migration system, each customer device associated with the set of the one or more accounts to receive data from the second VoIP phone system; and
    migrating account settings data and account call history data associated with the set of the one or more accounts from the one or more first VoIP phone systems to the second VoIP phone system.

2. The method of claim 1, wherein the account data comprises Voice over Internet Protocol (VoIP) account data.

3. The method of claim 1, wherein organizing the set of the one or more accounts further includes grouping the set of the one or more accounts into one or more account groups based on at least one of usage pattern, time-zone, call-plan, or group size.

4. The method of claim 1, wherein organizing the one or more accounts further comprises ordering the one or more account groups.

5. The method of claim 4, wherein ordering the one or more account groups is based on at least one of usage pattern, time-zone, call-plan, or group size.

6. The method of claim 3, wherein migrating the set of the one or more accounts into one or more shell accounts further comprises migrating the set of the one or more account groups into one or more shell accounts.

7. The method of claim 1, wherein a shell account comprises a standard account that is feature settings-free.

8. The method of claim 1, wherein configuring each customer device associated with the set of the one or more accounts further comprises updating one or more configuration files associated with each customer device such that each customer device is configured to receive data traffic from the second VoIP phone system.

9. The method of claim 1, further comprising causing the rebooting of each customer device associated with the set of the one or more accounts.

10. The method of claim 1, further comprising testing a dial-tone for each customer device.

11. A non-transitory computer readable medium comprising code to perform the acts of the method of claim 1.

12. A system, comprising:
    a database for storing account data associated with migrating one or more accounts from one or more first VoIP phone systems to a second VoIP phone system via a network; and
    a network element communicatively coupled to the network and configured to:
        organize the one or more accounts based on at least one customer service record and at least one system log, wherein the organizing comprises:
            determining, based on the at least one of the customer service record and the at least one system log, whether a corresponding account is associated with at least one of an abnormal customer device or an abnormal customer device configuration; and
            identifying as abnormal an account corresponding to at least one of an abnormal customer device or an abnormal customer device configuration;
        migrate a set of the one or more accounts, excluding at least the abnormal account, into one or more shell accounts provided by the second VoIP phone system;
        configure each customer device associated with the set of the one or more accounts to receive data from the second VoIP phone system; and
        migrate account settings data and account call history data associated with the set of the one or more accounts from the one or more first VoIP phone systems to the second VoIP phone system.

13. The system of claim 12, wherein the account data comprises Voice over Internet Protocol (VoIP) account data.

14. The system of claim 12, wherein the network element is further configured to group the set of the one or more accounts into one or more account groups based on at least one of usage pattern, time-zone, call-plan, or group size.

15. The system of claim 14, wherein the network element is further configured to order the one or more account groups.

16. The system of claim 15, wherein ordering the one or more account groups is based on at least one of usage pattern, time-zone, call-plan, or group size.

17. A method, comprising:
    receiving account data associated with one or more accounts scheduled to be migrated from one or more first VoIP phone systems to a second VoIP phone system via a network;
    organizing the one or more accounts based on at least one customer service record and at least one system log, wherein organizing comprises:
    determining, based on the at least one of the customer service record and the at least one system log, whether a corresponding account is associated with at least one of an abnormal customer device or an abnormal customer device configuration; and
    identifying as abnormal an account corresponding to at least one of an abnormal customer device or an abnormal customer device configuration;
    migrating a set of the one or more accounts, excluding at least the abnormal account, into one or more shell accounts provided by the second VoIP phone system;
    configuring, using a migration system, each customer device associated with the set of the one or more accounts to receive data from the second VoIP phone system;
    rebooting each customer device associated with the set of the one or more accounts;
    testing a dial-tone for each customer device; and
    migrating account settings data and account call history data associated with the set of the one or more accounts from the one or more first VoIP phone systems to the second VoIP phone system.

18. A non-transitory computer readable medium comprising code to perform the acts of the method of claim 17.

19. The method of claim 1, wherein the abnormal customer device is at least one of an obsolete customer device or an unsupported customer device that is not configured to function according to requirements of the second VoIP phone system.

20. The method of claim 1, wherein the abnormal customer device configuration has a customer device configuration that may impair the quality of service provided by the second VoIP phone system.

* * * * *